US012597548B2

(12) United States Patent
Luo et al.

(10) Patent No.: US 12,597,548 B2
(45) Date of Patent: Apr. 7, 2026

(54) INDUCTOR DEVICE

(71) Applicant: Realtek Semiconductor Corporation, Hsinchu (TW)

(72) Inventors: Cheng-Wei Luo, Hsinchu (TW); Hsiao-Tsung Yen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 800 days.

(21) Appl. No.: 17/933,853

(22) Filed: Sep. 21, 2022

(65) Prior Publication Data

US 2023/0144972 A1 May 11, 2023

(30) Foreign Application Priority Data

Nov. 8, 2021 (TW) ................................ 110141575

(51) Int. Cl.
*H01F 17/00* (2006.01)
*H01F 17/02* (2006.01)

(52) U.S. Cl.
CPC ......... *H01F 17/0013* (2013.01); *H01F 17/02* (2013.01); *H01F 2017/004* (2013.01); *H01F 2017/0073* (2013.01)

(58) Field of Classification Search
CPC ................. H01F 17/0013; H01F 17/02; H01F 2017/004; H01F 2017/0073; H01F 27/40; H01F 17/0006
USPC ........................................ 336/200, 232, 192
See application file for complete search history.

(56) References Cited

U.S. PATENT DOCUMENTS 6,661,306 B2 * 12/2003 Goyette ................... H03H 7/42 336/232
2010/0231317 A1 * 9/2010 Frye ........................ H01L 23/66 257/E27.024
2013/0257577 A1 * 10/2013 Nazarian ................. H01F 27/34 336/200
2014/0077919 A1 * 3/2014 Godoy .................... H01F 30/08 336/226
2014/0140028 A1 * 5/2014 Lenive ................ H01F 17/0006 361/782
2020/0312511 A1 * 10/2020 Yen ......................... H01F 27/29

FOREIGN PATENT DOCUMENTS

CN 210641154 U 5/2020
CN 210744173 U 6/2020
CN 114121406 A * 3/2022 ............... H03H 1/00

OTHER PUBLICATIONS

A. Watson et al., "Compact modeling of differential spiral inductors in Si-based RFICs," 2004 IEEE MTT-S International Microwave Symposium Digest (IEEE Cat. No. 04CH37535), 2004, pp. 1053-1056, vol. 2, doi: 10.1109/MWSYM.2004.1339165.

* cited by examiner

*Primary Examiner* — Shawki S Ismail
*Assistant Examiner* — Kazi S Hossain
(74) *Attorney, Agent, or Firm* — CKC & Partners Co., LLC

(57) ABSTRACT

An inductor device is disclosed herein. An electrical device is disposed in a first area of the inductor device, and the inductor device includes a first trace and a second trace. The first trace is disposed in a second area. The second trace is disposed in the second area, and coupled to the first trace. The second area is disposed an outer side of the first area, and the first area and the second area are not overlapped with each other.

19 Claims, 5 Drawing Sheets

INDUCTOR DEVICE

RELATED APPLICATIONS

This application claims priority to and the benefit of Taiwan Application Serial Number 110141575, filed on Nov. 8, 2021, the entire contents of which are incorporated herein by reference as if fully set forth below in its entirety and for all applicable purposes.

BACKGROUND

Field of Invention

The present disclosure relates to an electrical device. More particularly, the present disclosure relates to an inductor device.

Description of Related Art

For different circumstances, inductors are designed to be various shapes. With development of technology, electrical devices become lighter, thinner, shorter, and smaller. If there is any empty area generated around inductors due to the shape of the inductors, and the empty area is not used, it is unfavorable to electrical devices for becoming lighter, thinner, shorter, and smaller.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure provides an inductor device. An electrical device is disposed in a first area of the inductor device, and the inductor device includes a first trace and a second trace. The first trace is disposed in a second area. The second trace is disposed in the second area, and coupled to the first trace. The second area is disposed outside of the first area, and the first area and the second area are not overlapped with each other.

Therefore, based on the technical content of the present disclosure, the inductor device of the present disclosure can use the empty area efficiently to dispose the inductor device, such that the inductance of the whole device enhances.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Furthermore, as used herein and in the claims, the singular forms "a" and "an" include the plural reference unless the context clearly indicates otherwise.

Figure 1:
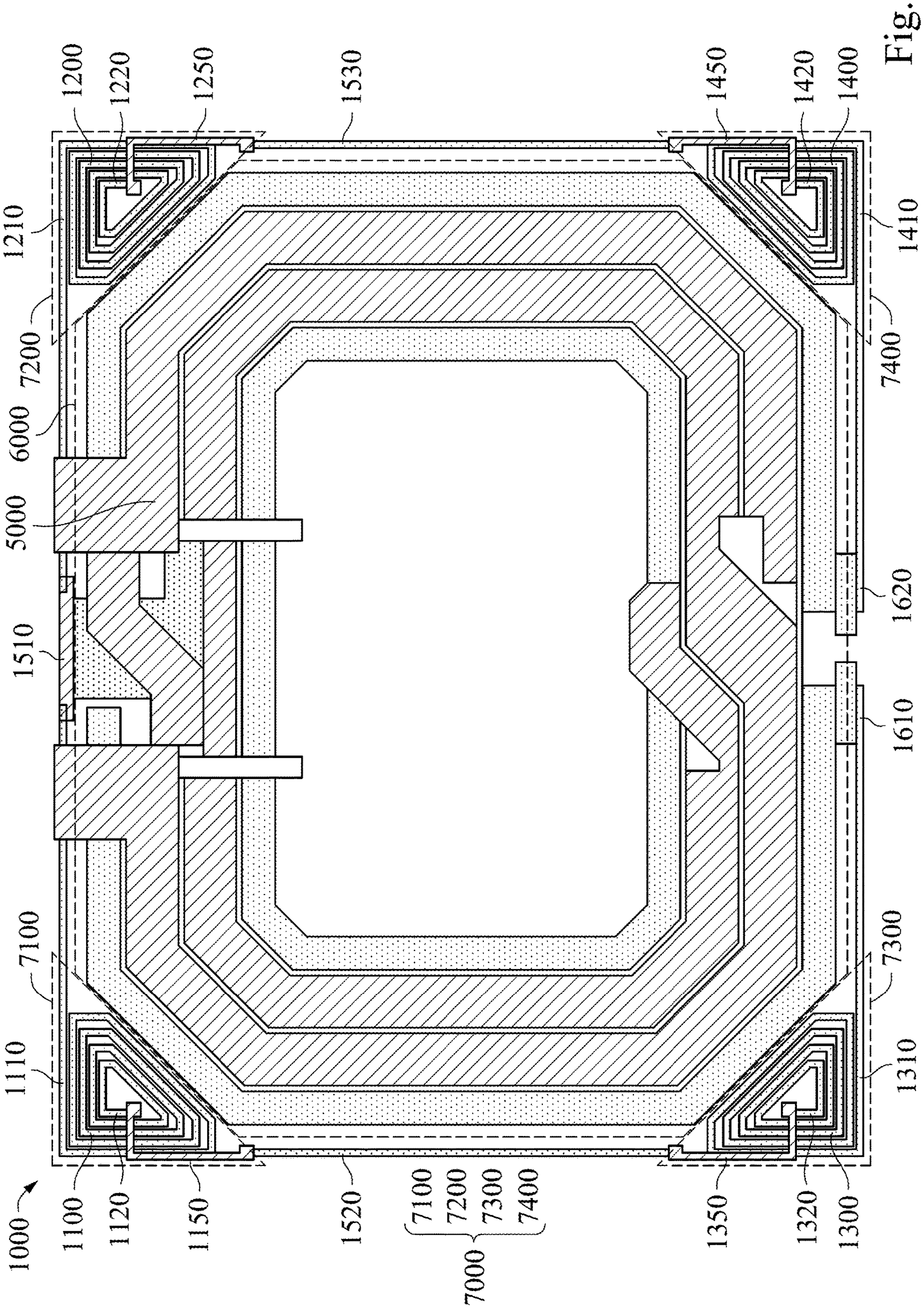
FIG. 1 depicts a schematic diagram of an inductor device and an electrical device according to one embodiment of the present disclosure.

FIG. 1 depicts a schematic diagram of an inductor device 1000 and an electrical device 5000 according to one embodiment of the present disclosure. As shown in the figure, the electrical device 5000 is disposed inside the first area 6000 of the inductor device 1000. In one embodiment, the electrical device 5000 can be another inductor device or a balanced to unbalanced device (balun), however, the present disclosure is not limited to this regard.

Figure 2:
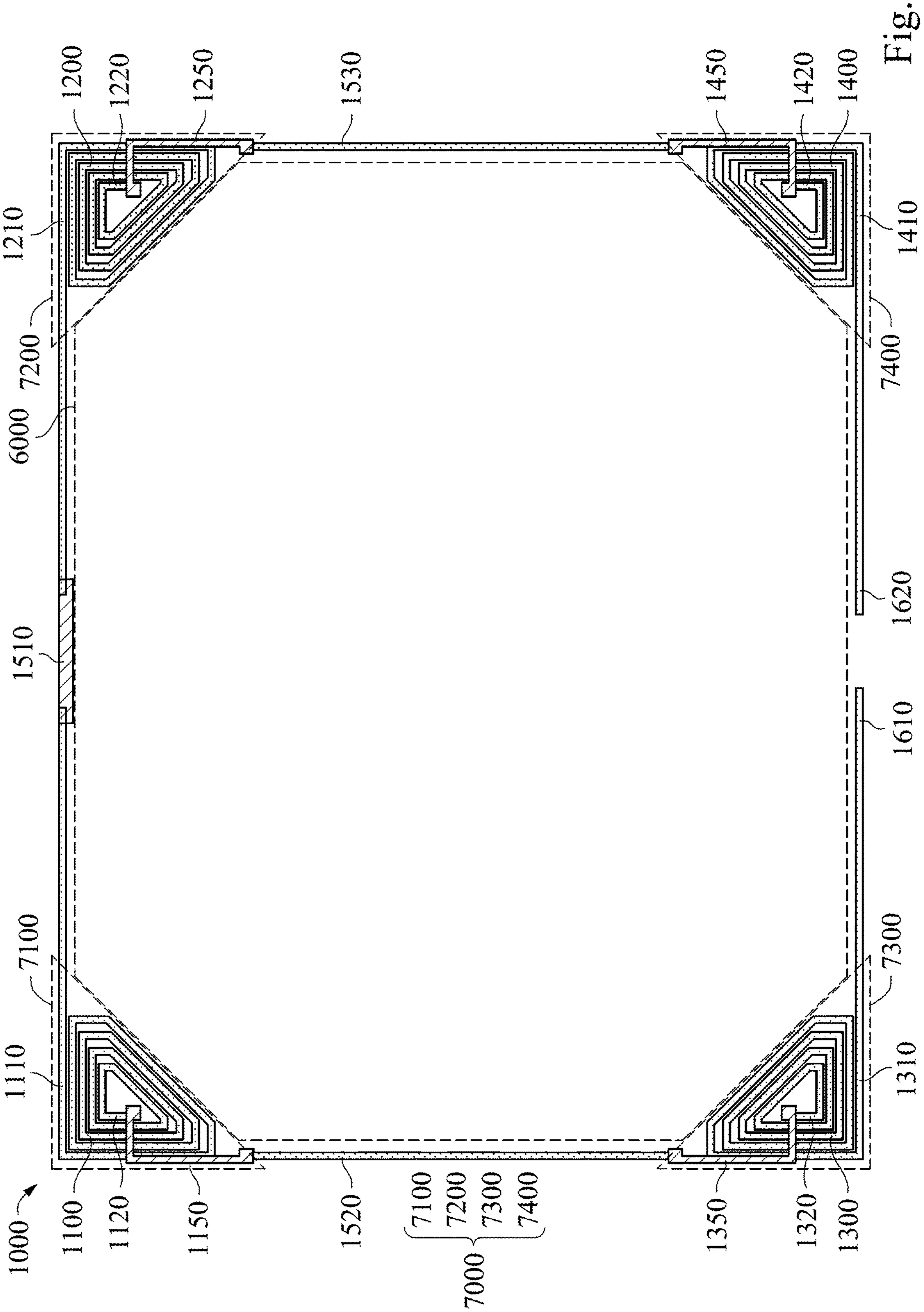
FIG. 2 depicts a schematic diagram of the inductor device shown in FIG. 1 according to one embodiment of the present disclosure.

For facilitating the understanding of the inductor device 1000 in FIG. 1, reference is now made to FIG. 2. FIG. 2 depicts a schematic diagram of the inductor device 1000 shown in FIG. 1 according to one embodiment of the present disclosure. As shown in the figure, the inductor device 1000 includes a first trace 1100 and a second trace 1200. The first trace 1100 is disposed at a second area 7000. The second trace 1200 is disposed at the second area 7000, and coupled to the first trace 1100. The second area 7000 is disposed at the outer side of the first area 6000, and the first area 6000 and the second area 7000 do not overlap to each other.

As a result, the inductor device 1000 of the present disclosure can be disposed at an empty area (e.g., the second area 7000) which is at the outer side of the electrical device 5000, so as to use the empty area efficiently, such that the inductance of the whole device enhances.

In one embodiment, the first trace 1100 includes a plurality of first wires (e.g., the first wire 1110, the first wire 1120), and the second trace 1200 includes a plurality of second wires (e.g., the second wire 1210, the second wire 1220). For example, in order to enhance inductance, the first trace 1100 is winded to form a plurality of first wires (e.g., the first wire 1110, the first wire 1120) at the upper-left corner of the figure. Similarly, the second trace 1200 is winded to form a plurality of second wires (e.g., the second wire 1210, the second wire 1220) at the upper-right corner of the figure. In addition, the first wires (e.g., the first wire 1110, the first wire 1120) can be disposed at a sub-area 7100 of the second area 7000, and the second wires (e.g., the second wire 1210, the second wire 1220) can be disposed at a sub-area 7200 of the second area 7000.

In one embodiment, the first wire 1110 which is located at an outermost side of the first wires (e.g., the first wire 1110, the first wire 1120) is coupled to the second wire 1210 which is located at an outermost side of the second wires (e.g., the second wire 1210, the second wire 1220). In another embodiment, the inductor device 1000 further includes a first connecting element 1510, and the first connecting element 1510 is configured to connect to the first wire 1110 which is located at the outermost side of the first wire (e.g., the first wire 1110, the first wire 1120) and the second wire 1210 which is located at the outermost side of the second wire (e.g., the second wire 1210, the second wire 1220). In one embodiment, the first connecting element 1510 can be a center-tapped terminal (central tap).

In one embodiment, the inductor device 1000 further includes a third trace 1300 and a fourth trace 1400. The third trace 1300 and the fourth trace 1400 are disposed at the second area 7000. In another embodiment, the third trace 1300 includes a plurality of third wires (e.g., the third wire 1310, the third wire 1320), and the fourth trace 1400 includes a plurality of fourth wires (e.g., the fourth wire 1410, the fourth wire 1420). For example, in order to enhance inductance, the third trace 1300 is winded to form a plurality of third wires (e.g., the third wire 1310, the third wire 1320) at the lower-left corner of the figure. Similarly, the fourth trace 1400 is winded to form a plurality of fourth wires (e.g., the fourth wire 1410, the fourth wire 1420) at the lower-right corner of the figure. In addition, the third wires (e.g., the third wire 1310, the third wire 1320) can be disposed at a sub-area 7300 of the second area 7000, and the fourth wires (e.g., the fourth wire 1410, the fourth wire 1420) can be disposed at a sub-area 7400 of the second area 7000.

In one embodiment, the inductor device 1000 further includes a first bridging element 1150 and a second bridging element 1350. The first bridging element 1150 is configured to connect to the first wire 1120 which is located at an innermost side of the first wires (e.g., the first wire 1110, the first wire 1120). The second bridging element 1350 is coupled to the first bridging element 1150, and configured to connect to the third wire 1320 which is located at an innermost side of the third wires (e.g., the third wire 1310, the third wire 1320). In another embodiment, the inductor device 1000 further includes a second connecting element 1520, and the second connecting element 1520 is configured to connect to the first bridging element 1150 and the second bridging element 1350.

In one embodiment, the inductor device 1000 further includes a first input/output element 1610, and the first input/output element 1610 is coupled to the third wire 1310 which is located at the outermost side of the third wires (e.g., the third wire 1310, the third wire 1320). The first input/output element 1610 is a terminal used to input or output a signal.

In one embodiment, the first trace 1100, the second trace 1200, the third trace 1300, the fourth trace 1400, the second connecting element 1520, and the first input/output element 1610 are located at a first layer, and the first connecting element 1510, the first bridging element 1150, and the second bridging element 1350 are located at a second layer. For example, the first layer is a UTM (Ultra Thick Meta) layer, and the second layer is a RDL (Redistribution Layer).

In one embodiment, the inductor device 1000 further includes a third bridging element 1250 and a fourth bridging element 1450. The third bridging element 1250 is configured to connect to the second wire 1220 which is located at an innermost side of the second wires (e.g., the second wire 1210, the second wire 1220). The fourth bridging element 1450 is coupled to the third bridging element 1250, and configured to connect to the fourth wire 1420 which is located at an innermost side of the fourth wires (e.g., the fourth wire 1410, the fourth wire 1420). In another embodiment, the inductor device 1000 further includes a third connecting element 1530, and the third connecting element 1530 is configured to connect to the third bridging element 1250 and the fourth bridging element 1450.

In one embodiment, the inductor device 1000 further includes a second input/output element 1620, and the second input/output element 1620 is coupled to the fourth wire 1410 which is located at the outermost side of the fourth wires (e.g., the fourth wire 1410, the fourth wire 1420). The second input/output element 1620 is a terminal used to input or output a signal.

In one embodiment, the third connecting element 1530 and the second input/output element 1620 are located at the first layer, and the third bridging element 1250 and the fourth bridging element 1450 are located at the second layer. For example, the first layer is a UTM layer, and the second layer is a RDL.

As shown in FIG. 1, the shape of the electrical device 5000 can be octagon. Therefore, the shape of the first area 6000, where the electrical device 5000 is located, is octagon. Since the shape of the first area 6000 is octagon, the shape of the second area 7000 around the octagon is triangle. The inductor device 1000 of the present disclosure can be disposed at these triangle areas, so as to enhance the inductance. Specifically, the shape of the sub-areas 7100, 7200, 7300, 7400 of the second area 7000 can be triangles, and the sub-areas 7100, 7200, 7300, 7400 are located at the upper-left corner, the upper-right corner, the lower-left corner, and the lower-right corner of the inductor device 1000. However, the present disclosure is not limited to the embodiments as shown in FIG. 1 and FIG. 2, those skilled in the art can adopt diamond or other suitable shape of the electrical device 5000 to dispose inductor device 1000 around the electrical device 5000, depending on actual requirements.

Figure 3:
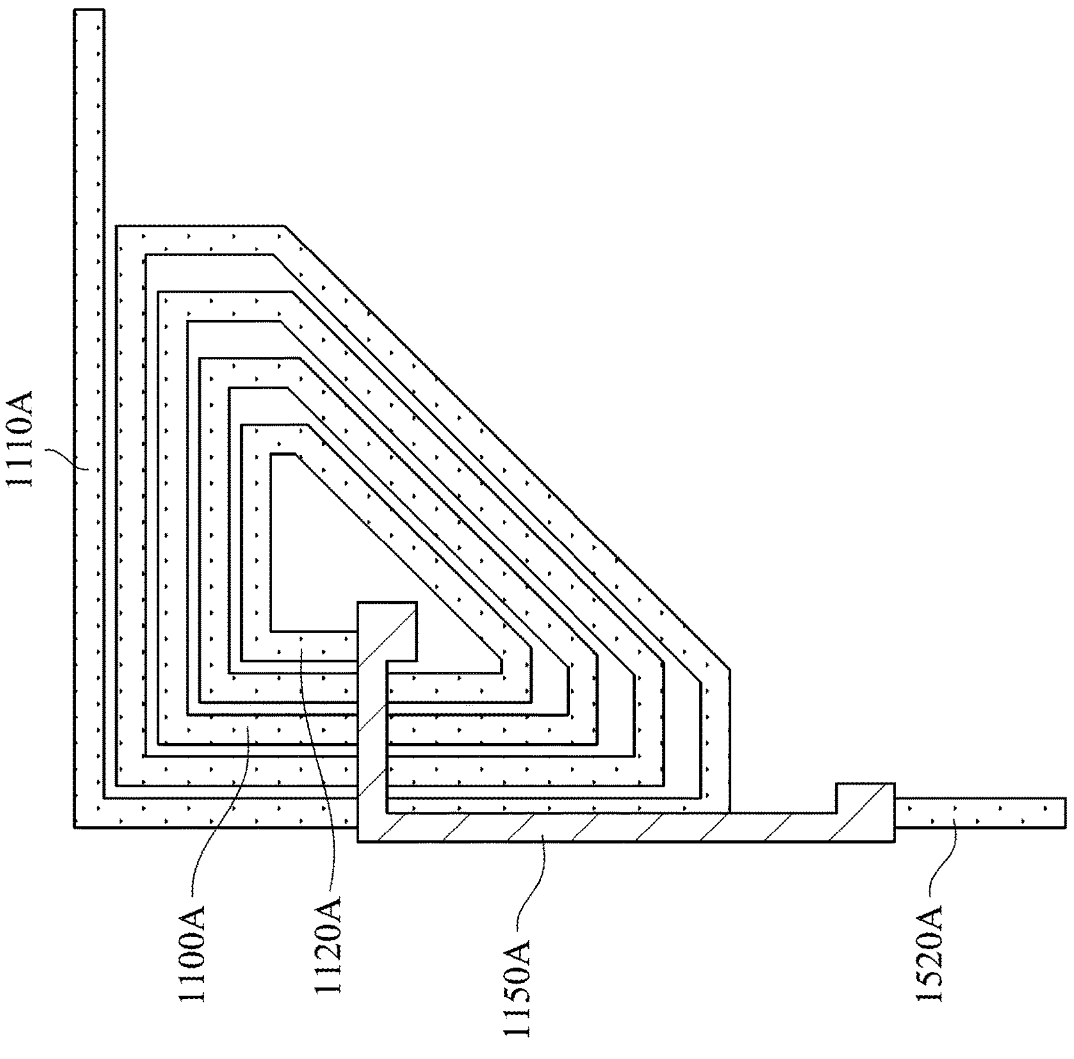
FIG. 3 depicts a schematic diagram of a partial structure of the inductor device shown in FIG. 2 according to one embodiment of the present disclosure.

FIG. 3 depicts a schematic diagram of a partial structure of the inductor device 1000 shown in FIG. 2 according to one embodiment of the present disclosure. As shown in the figure, the structure shown in FIG. 2 is the upper-left corner of the inductor device 1000. The structure in the upper-left corner includes the first wires (e.g., the first wire 1110A, the first wire 1120A) and the first bridging element 1150A. As can be seen in the figure, a winding direction of the first wires (e.g., the first wire 1110A, the first wire 1120A) is a counterclockwise direction. Similarly, in the inductor device 1000 of FIG. 2, a winding direction of the second wires (e.g., the second wire 1210, the second wire 1220), the third wires (e.g., the third wire 1310, the third wire 1320) and the fourth wires (e.g., the fourth wire 1410, the fourth wire 1420) can be a counterclockwise direction. It is noted that, the element in FIG. 3, whose symbol is similar to the symbol of the element in FIG. 1 and FIG. 2, has similar structure feature in connection with the element in FIG. 1 and FIG. 2. Therefore, a detail description regarding the structure feature of the element in FIG. 3 is omitted herein for the sake of brevity. Besides, the present disclosure is not limited to the structure as shown in FIG. 3, and it is merely an example for illustrating one of the implements of the present disclosure.

Figure 4:
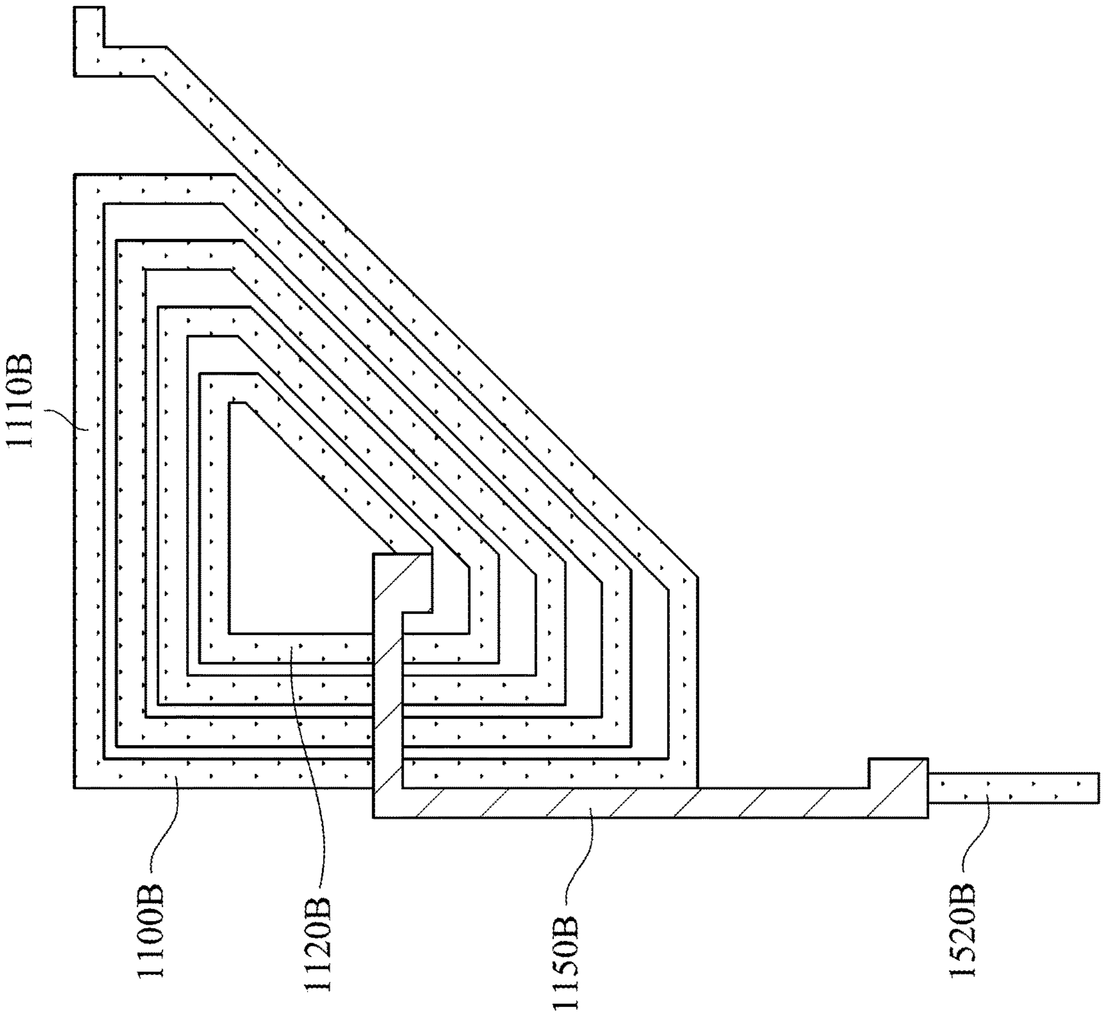
FIG. 4 depicts a schematic diagram of a partial structure of the inductor device shown in FIG. 2 according to one embodiment of the present disclosure.

FIG. 4 depicts a schematic diagram of a partial structure of the inductor device 1000 shown in FIG. 2 according to one embodiment of the present disclosure. As shown in the figure, the structure shown in FIG. 2 is the upper-left corner of the inductor device 1000. The structure in the upper-left corner includes the first wires (e.g., the first wire 1110B, the first wire 1120B) and the first bridging element 1150B. As can be seen in the figure, a winding direction of the first wires (e.g., the first wire 1110B, the first wire 1120B) is a clockwise direction. Similarly, in the inductor device 1000 of FIG. 2, a winding direction of the second wires (e.g., the second wire 1210, the second wire 1220), the third wires (e.g., the third wire 1310, the third wire 1320) and the fourth wires (e.g., the fourth wire 1410, the fourth wire 1420) can also be a clockwise direction. It is noted that, the element in FIG. 4, whose symbol is similar to the symbol of the element in FIG. 1 and FIG. 2, has similar structure feature in connection with the element in FIG. 1 and FIG. 2. Therefore, a detail description regarding the structure feature of the element in FIG. 4 is omitted herein for the sake of brevity. Besides, the present disclosure is not limited to the structure as shown in FIG. 4, and it is merely an example for illustrating one of the implements of the present disclosure.

Figure 5:
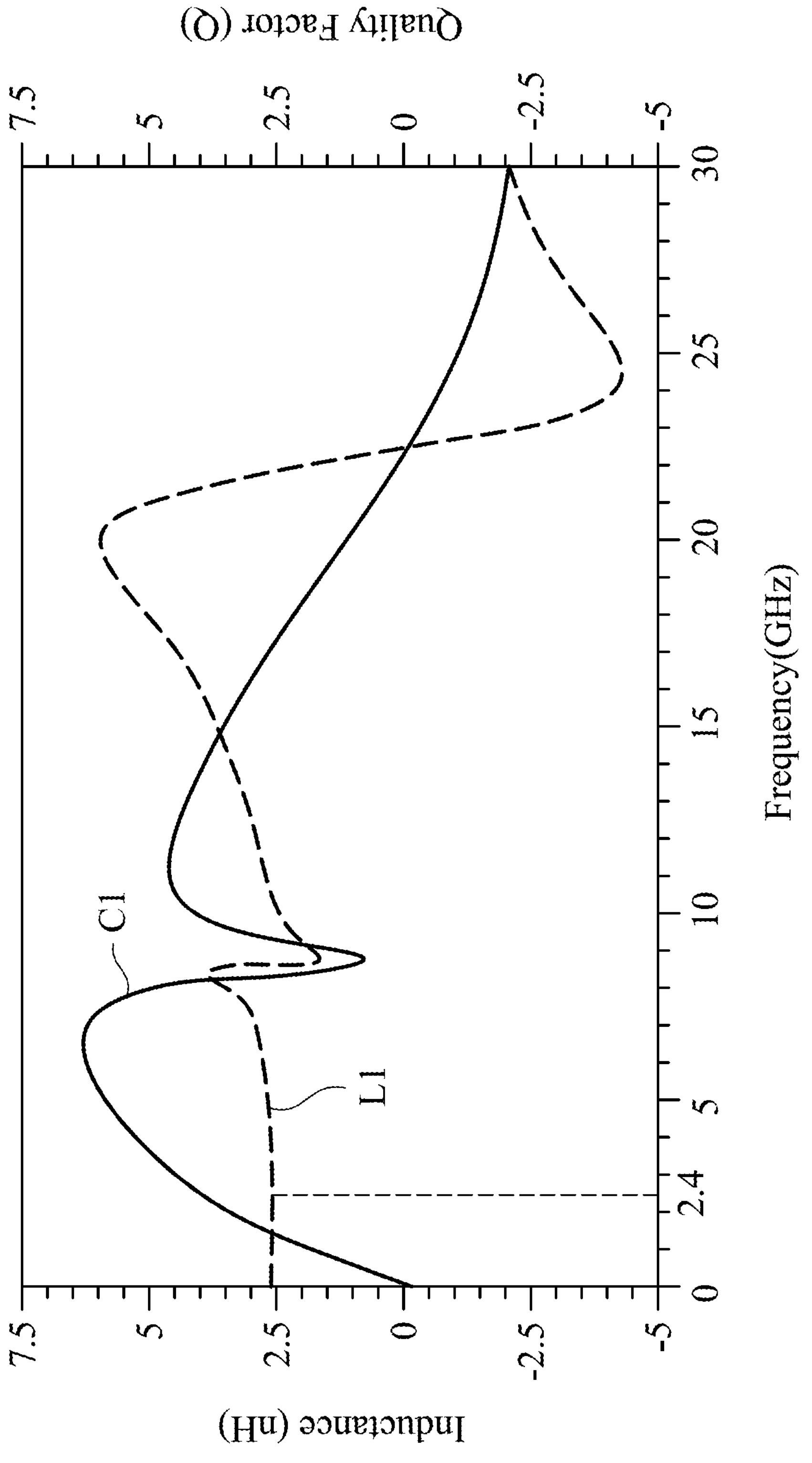
FIG. 5 depicts a schematic diagram of experimental data of an inductor device according to one embodiment of the present disclosure.

FIG. 5 depicts a schematic diagram of experimental data of an inductor device 1000 according to one embodiment of the present disclosure. The experimental curve of the inductance adopting the structural configuration of the present disclosure is L1, and experimental curve of the quality factor adopting the structural configuration of the present disclosure is C1. As can be seen from the figure, the inductor device 1000 adopting the structural configuration of the present disclosure provides additional inductance, so as to enhance the inductance of the whole device. For example, at a frequency 2.4 GHz, the inductance of the inductor device 1000 is about 2.5 nH.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, wherein an electrical device is disposed at a first area which is inside the inductor device, and the inductor device comprises:

a first trace, disposed at a second area and comprising a plurality of first wires; and a second trace, disposed at the second area, and coupled to the first trace, wherein the second area is disposed at an outer side of the first area, and the first area and the second area do not overlap to each other;

a third trace, disposed at the second area, coupled to the first trace, and comprising a plurality of third wires;

a first bridging element, configured to connect to the first wire which is located at an innermost side of the first wires; and a second bridging element, coupled to the first bridging element, and configured to connect to the third wire which is located at an innermost side of the third wires, wherein the second area comprises a plurality of sub-areas, and the first area is located between any two of the plurality of sub-areas.

2. The inductor device of claim 1, wherein the second trace comprises a plurality of second wires.

3. The inductor device of claim 2, wherein the first wire which is located at outermost side of the first wires is coupled to the second wire which is located at outermost side of the second wires.

4. The inductor device of claim 3, further comprising:

a first connecting element, configured to connect to the first wire which is located at outermost side of the first wires and the second wire which is located at outermost side of the second wires.

5. The inductor device of claim 4, wherein the first connecting element comprises a center-tapped terminal.

6. The inductor device of claim 2, further comprising:

a fourth trace, disposed at the second area, and coupled to the second trace.

7. The inductor device of claim 6, wherein the fourth trace comprises a plurality of fourth wires.

8. The inductor device of claim 7, further comprising:

a second connecting element, configured to connect to the first bridging element and the second bridging element.

9. The inductor device of claim 8, further comprising:

a first input/output element, coupled to the third wire which is located at an outermost side of the third wires.

10. The inductor device of claim 9, wherein the first trace, the second trace, the third trace, and the fourth trace are located at a first layer, and the first bridging element and the second bridging element are located at a second layer.

11. The inductor device of claim 10, further comprising:

a third bridging element, configured to connect to the second wire which is located at an innermost side of the second wires; and a fourth bridging element, coupled to the third bridging element, and configured to connect to the fourth wire which is located at an innermost side of the fourth wires.

12. The inductor device of claim 11, further comprising:

a third connecting element, configured to connect to the third bridging element and the fourth bridging element.

13. The inductor device of claim 12, further comprising:

a second input/output element, coupled to the fourth wire which is located at an outermost side of the fourth wires.

14. The inductor device of claim 13, wherein the third bridging element and the fourth bridging element are located at the second layer.

15. The inductor device of claim 1, wherein a shape of the first area comprises an octagon.

16. The inductor device of claim 15, wherein a shape of the second area comprises a triangle.

17. The inductor device of claim 1, wherein the sub-areas are located at a plurality of corners of the inductor device.

18. The inductor device of claim 7, wherein a winding direction of the first wires, the second wires, the third wires, and the fourth wires comprises a clockwise direction.

19. The inductor device of claim 7, wherein a winding direction of the first wires, the second wires, the third wires, and the fourth wires comprises a counterclockwise direction.

* * * * *